United States Patent
Shimada

(10) Patent No.: US 6,632,547 B2
(45) Date of Patent: Oct. 14, 2003

(54) SUBSTRATE FOR MAGNETIC RECORDING MEDIUM, MANUFACTURING METHOD THEREOF, AND MAGNETIC RECORDING MEDIUM

(75) Inventor: Takashi Shimada, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 180 days.

(21) Appl. No.: 09/796,105

(22) Filed: Feb. 28, 2001

(65) Prior Publication Data
US 2001/0019785 A1 Sep. 6, 2001

(30) Foreign Application Priority Data
Mar. 2, 2000 (JP) ........................................ 2000-056952

(51) Int. Cl.$^7$ ................................................. G11B 5/66
(52) U.S. Cl. .................. 428/694 SG; 428/694 TR; 428/694 BR; 428/900; 427/128; 427/129; 427/130; 427/131; 451/36; 451/41; 451/288

(58) Field of Search .................. 428/694 TR, 694 BR, 428/694 SG, 900; 427/128–131; 451/41, 36, 288

(56) References Cited

U.S. PATENT DOCUMENTS 5,899,794 A * 5/1999 Shige et al. .................. 451/41

FOREIGN PATENT DOCUMENTS

JP 62213957 * 9/1987

* cited by examiner

*Primary Examiner*—Leszek Kiliman
(74) *Attorney, Agent, or Firm*—Darby & Darby

(57) ABSTRACT

A slowly advancing tape-shaped matrix is pressed into contact with a surface of a rapidly rotating non-magnetic substrate for a magnetic recording medium. An abrasive slurry is added to the matrix. The area contact rate between the matrix and the surface, as well as the contact pressure per unit area between the matrix and the surface are regulated to both polish and slightly roughen the surface in a single process. In the case of a glass presubstrate, the glass is chemically strengthened before being surface-treated.

20 Claims, 2 Drawing Sheets

SUBSTRATE FOR MAGNETIC RECORDING MEDIUM, MANUFACTURING METHOD THEREOF, AND MAGNETIC RECORDING MEDIUM

BACKGROUND

1. Field of the Invention

The present invention relates to a non-magnetic substrate used for a magnetic recording medium to be mounted in various magnetic recording devices such as the external memories of computers. The present invention also relates to a manufacturing method for the substrate, and a magnetic recording medium incorporating the substrate.

2. Prior Art

A substrate for a magnetic recording medium (hereinafter simply referred to as a medium), for high recording density, requires highly accurate surface roughness and mechanical properties. These properties are attained by highly developed precision processing and polishing. Demand for a substrate with higher accuracy surface roughness and mechanical properties comes from the necessity for a magnetic head to fly at a lower flying height over the magnetic medium. As the recording density increases, the flying height must be further reduced.

Aluminum alloy, etc. has chiefly been employed for the substrate for the medium. A circular non-magnetic metal substrate is formed by electroless plating a nickel-phosphorus layer on the aluminum substrate. The nickel-phosphorus layer is lapped and polished to a smooth mirror-finished surface. In addition the nickel-phosphorus layer is textured to prevent the magnetic head from sticking to the layer and to improve the magnetic recording characteristics of the medium. The polishing surface platen generally stacks a pair of surface platens. Pad are attached to the surfaces where the upper and lower surface platens contact each other. The substrate is fixed between the upper and lower pads with a carrier.

An abrasive suspension, such as slurry, is added between the upper and lower pads while revolving the surface platens. The sides of the substrates are polished to form mirror-finished sides. The entire area of the substrate side comes in contact with the pad acting as a matrix at a time. The texturing surface platen, in general, uses a matrix such as an abrasive tape and a pad cut in a roll, etc. running in one direction. A rubber roller presses the matrix into contact with a part of the side of a revolving substrate in such a manner that a longitudinal direction of the contact side lies at right angles to the direction of a running matrix. The addition of drops of the abrasive slurry suspension to the contact side forms a texture in circumferential direction of the substrate. The ratio of the contact side area to the total substrate side area is four percent or less.

A highly rigid, non-metal substrate has come to be used as a circular, non-magnetic substrate of late. The substrate consists, for instance, of glass. The desired high revolution speed of a substrate gives rise to substrate oscillation, etc. The high rigidity, however, tends to suppress substrate oscillation. The glass substrate includes a chemically strengthened substrate and a crystallized substrate. A chemically strengthened substrate is formed by press-forming glass powder into a circular glass plate or cutting a circular glass plate out of float-process plate glass, lapping and polishing surface of the circular glass plate, and chemically strengthening the glass plate. A crystallized substrate is formed by crystallizing a press-formed circular glass plate, and lapping and polishing surface of the circular glass plate. Lapping and polishing surface of the circular glass plate is conducted in the same way as a non-magnetic metal substrate made of an aluminum alloy.

Manufacturing a chemically strengthened glass substrate requires lapping and polishing followed by chemical strengthening. Polishing in the manufacture of a chemically strengthened glass substrate poses the problem that the polishing pad clogs up and deteriorates the same as in the manufacture of a non-magnetic metal substrate. In addition, chemical strengthening following the polishing process leaves occasional surface irregularities (irregular projections). To deal with this problem, additional polishing is required to remove the surface irregularities after chemical strengthening is completed. Polishing following chemical strengthening, however, leaves an alkaline residue component, which chemical strengthening has diffused into the surface through ion exchange. The alkaline residue tends to leach out of the strained layer, thereby degrading the mechanical properties of the substrate.

The present invention was achieved in view of the problems mentioned earlier.

Recent years have seen a requirement for increased recording density and reduced manufacturing costs of a magnetic recording apparatus. Increasing the recording density of a magnetic recording medium requires increased smoothness of a side of a non-magnetic substrate incorporated in a medium. The manufacturing surface platen for an aluminum alloy non-magnetic metal substrate comprises the following steps: lapping an aluminum alloy plate to smooth the side thereof, polishing several times (usually twice) the aluminum alloy plate to give a mirror-finished side, and texturing the aluminum alloy plate in the circumferential direction of the side.

Polishing processes the entire side of a substrate at a time. Polishing, on one hand, has the advantage of requiring a low contact pressure of a matrix. On the other hand, polishing has the disadvantage that it causes deterioration and clogging of the pad during processing. This makes it difficult to continuously produce uniform smoothness on the sides of the substrates. To cope with clogging, it has conventionally been required to stop processing on a regularly basis to clean the pad. This cleaning process is known as dressing. Cleaning the pad, however, does not eliminate deterioration of the pad. Thus, the pad must be exchanged for a new pad at a certain frequency. The higher the demand for surface roughness accuracy of a substrate, the more frequently is the need for cleaning and exchange of a pad. As a consequence, manufacturing cost is increased. Polishing cannot form suitable grooves in the circumferential direction of the substrate corresponding to those produced in a texturing process. In contrast to polishing, texturing, on one hand, eliminates the deterioration and clogging of a matrix thanks to the application of a constantly renewed matrix such as a pad to a substrate. Texturing, on the other hand, puts a matrix into contact with no more than some 4 percent or less of the area of the substrate side. Polishing, in contrast, processes the entire side of a substrate. Therefore, texturing is unsuitable for removing surface defects such as pits and nodules, etc. generated by plating. Texturing, further, has the problem that pressure per unit area applied to the substrate cannot be reduced. Increasing pressure per unit area applied to a substrate causes grit in the abrasive slurry increase its abrasive activity. This increases the difficulty in forming a smooth side due to roughening of the surface and generation of blemishes such as scratches, etc. Texturing is suitable for forming a texture, consisting of grooves in the circumferential direction of the substrate. However, as described above, texturing is no substitute for polishing in terms of forming a smooth and mirror finished side. Thus, manufacturing a non-magnetic metal substrate requires both polishing and texturing.

OBJECTS AND SUMMARY OF THE INVENTION

It is an object of the present invention to provide a non-magnetic substrate with increased surface roughness accuracy and improved machine characteristics.

Another object of the present invention is to provide a process for manufacturing a substrate with reduced manufacturing cost.

A further object of the present invention is to provide a magnetic recording medium with a high recording density using a substrate made as set forth earlier.

Briefly stated, the present invention provides a method in which a slowly advancing tape-shaped matrix is pressed into contact with a surface of a rapidly rotating non-magnetic substrate for a magnetic recording medium. An abrasive slurry is added to the matrix. The area contact rate between the matrix and the surface, as well as the contact pressure per unit area between the matrix and the surface are regulated to both polish and slightly roughen the surface in a single process. In the case of a glass presubstrate, the glass is chemically strengthened before being surface-finished.

According to an embodiment of the invention, there is provided a manufacturing process for a non-magnetic substrate for a magnetic recording medium comprising: pressing a running matrix of a surface-treating machine into contact with part of a side of a revolving presubstrate, adding an abrasive suspension to said matrix, and the step of pressing including pressing a contact rates of 15 to 25 percent by area of said side and at a pressure of 20 to 150 $g/cm^2$ According to a feature of the invention, there is provided a manufacturing process for a non-magnetic substrate for a magnetic recording medium comprising the step of: pressing a running matrix of a surface-treating machine into contact with part of a side of a revolving presubstrate, adding an abrasive suspension to said matrix, the step of pressing including contacting said substrate at contact rates of from about 2 to about 15 percent by area of said side, and the step of pressing further including pressing with a pressures of from about 25 to about to 800 $g/cm^2$.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figures 1A, 1B:
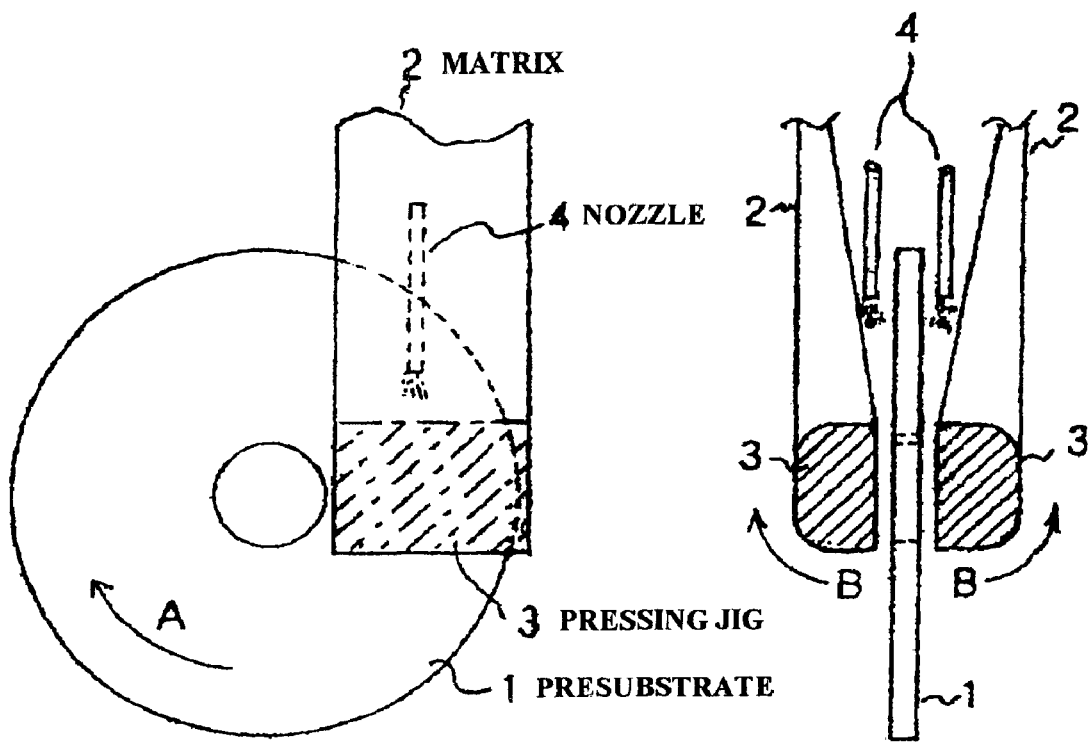
FIG. 1(a) and FIG. 1(b) are front view and side views, respectively, of a conceptual surface treating machine to which reference will be made in describing the present invention.

The following describes the constitution to solve the problem mentioned earlier. A magnetic recording medium comprises a non-magnetic under layer, a magnetic layer, a coating layer, and a liquid lubricating layer formed sequentially one on top of another on a non-magnetic substrate. Pressing a running matrix of a machine in contact with a side of a presubstrate while it is rotating yields a substrate. The contact rate of the matrix pressed into contact with the presubstrate side, and pressure per unit area applied through the matrix to the presubstrate side are regulated appropriately during surface treatment of the presubstrate. The recording medium is manufactured by adding the remaining layers to the substrate.

A first surface treatment consists of pressing a running matrix in contact with part of a side of a revolving presubstrate at contact rates of 15 to 25 percent by area of the side and pressures of 20 $g/cm^2$ to 150 $g/cm^2$. This treatment smooths and roughens the presubstrate side appropriately in a single process. The treatment efficiently removes all of the irregularities from the substrate side, for instance, pits or nodules, etc. formed during plating a non-magnetic metal presubstrate. The treatment also avoids the clogging or deterioration of a pad incurred in a polishing process. Accordingly, the treatment provides, accurately and continuously, a side with an uniform and ultrafine surface conformation. The treatment also textures the presubstrate side simultaneously in the circumferential direction. Hence, the surface treatment performs both polishing and texturing at a time. This provides a simplified manufacturing process and a reduced manufacturing cost of a non-magnetic metal substrate. Contact rates of less than 15 percent make it difficult to remove all the irregularities of a presubstrate side in a single process. Contact rates of more than 25 percent cause such problems as clogging up and deterioration of a matrix. When pressures per unit area applied to a side of a presubstrate through a matrix are less than 20 $g/cm^2$, the side is neither polished nor roughened sufficiently in one processing due to their poor processing ability. Pressures of more than 150 $g/cm^2$ cause irregularities attributable to abrasive particles in abrasive suspension. Further, substrates can be manufactured with the present treatment one sheet after another. Combining the treatment with washing a presubstrate sheet one after another, and then sequentially forming a non-magnetic under layer, a magnetic layer, and a protective layer on the substrate by sputtering enables manufacture of a medium with no breaks in processing. This eliminates the adherence of foreign bodies to the in-process substrates during downtime. This provides a medium with an improved error characteristic compared to one made with downtime that permits adherence of foreign bodies to occur.

Pressing a running matrix in contact with part of a side of a revolving presubstrate at contact rates of 2 to 15 percent by area of the side and pressures of 25 $g/cm^2$ to 800 $g/cm^2$ constitutes a second surface treatment. The treatment textures a presubstrate in the circumferential direction with the smoothness of a side unchanged. Contact rates of less than 2 percent, and pressures per unit area of less than 25 $g/cm^2$ applied to a side of a presubstrate through a matrix does not form a texture on the side of a presubstrate. Contact rates of more than 15 percent, and pressures per unit area of more than 800 $g/cm^2$ applied to a side of a presubstrate through a matrix, undesirably cause a change in smoothness in the side of a presubstrate.

The first or a second surface treatments set forth earlier can be used for a non-magnetic glass presubstrate. In place of lapping and polishing, followed by chemical strengthening, the present invention easily mirror-finishes a side of a presubstrate. In addition, chemical strengthening a non-magnetic glass presubstrate, then, instead of polishing, performing either the first or second surface treatment set forth earlier, suppresses alkaline ions from leaching out of the strained layer at the surface of the presubstrate. Irregularities formed during chemical strengthening are removed with the treatment. Hence, the treatment of the present invention yields an excellent substrate side with no loss of substrate strength. A second surface treatment, preceded by the chemical strengthening, forms a minute texture in the circumferential direction of a presubstrate without changing the smoothness of the presubstrate side. A medium using the substrate made with the invention reduces stiction of a magnetic head to the surface of the medium. The term stiction is an acronym derived from STatic frICTION. Stiction is defined as friction that tends to prevent relative motion between relatively movable parts at their null position. Stiction is more commonly understood to be the periodic cyclical momentary adhesion of one surface to another. It is the phenomenon of stiction which vibrates a string of a bowed stringed instrument, and also produces the squeaking of a rusty door hinge.

Referring to FIGS. 1(a) and 1(b), a presubstrate 1 revolves in the direction of arrow A. Respective matrices 2 are pressed in contact with the opposed sides of presubstrate 1 by pressing jigs 3 to produce a contact zone. The matrices 2 move inward and outward in the direction of arrows B. Nozzles 4 add an abrasive slurry suspension into the contact zones, thereby treating the sides of the presubstrate 1. The matrices 2 have sufficient width to cover the entire radial area of a presubstrate 1 to be processed. The final surface roughness conformation and pressure of a pressing jig 3, which is applied to a side of a presubstrate 1, is determined appropriately in accordance with the intended surface roughness of a side.

Applying the surface-treating machine and a first surface treatment set forth earlier to a presubstrate enables continuous polishing to produce a more uniform and smooth presubstrate side, compared with a conventional polishing process. Use of the surface-treating machine and a first surface treatment set forth earlier of an aluminum alloy presubstrate forms a fine texture in the circumferential direction of a presubstrate side along with a mirror-finished surface. A first surface treatment both polishes and textures a presubstrate side in the same process.

In the case of a glass presubstrate, before polishing with a surface-treating machine as shown in FIG. 1, the surface is lapped and chemically chemical strengthened to provide a more uniform and smooth side of the presubstrate. Then the side of the presubstrate is polished with the machine shown in FIG. 1 to remove surface irregularities caused by the chemical strengthening process. In addition, this treatment reduces the alkaline component leached out onto the surface of the presubstrate side, thereby eliminating the loss of substrate properties.

A second surface treatment of a glass presubstrate, following chemical strengthening, with a machine shown in FIG. 1 provides a substrate with a texture in the circumferential direction of the substrate with no loss in smoothness of a substrate side. A medium made from the substrate has a reduction tendency for stiction between a magnetic head.

The following describes embodiments of the present invention in terms of examples.

EXAMPLE 1

A side of a 3.5-inch aluminum alloy disk was plated with nickel-phosphorus electrolessly, and lapped. Then, the side was treated with a machine shown in FIG. 1. An abrasive tape, which consisted of a urethane-foam pad, advanced at a rate of 20 mm/min. The disk revolved at a rate of 300 rpm. The abrasive tape was pressed in contact with part of a side of a revolving disk at a contact rate of 15 area percent of the side and with a contact pressure of 98 g/cm$^2$. Slurry was poured over the contact zone for one minute to treat the side of the disk. The slurry included diamond particles at a concentration of 0.4 percent by weight. The diamond particles had an average diameter of 0.5 mm.

Treating a disk side starting with a center line average height Ra of 15 nm produced a disk side having a center line average height Ra of 1 nm. Simultaneously, a fine surface texture was formed in the circumferential direction of the disk.

EXAMPLE 2

A side of 2.5-inch glass disk was lapped. Then, the side was mirror-finished with the machine shown in FIG. 1. An abrasive tape, which consisted of a urethane-foam pad, was used. The abrasive suspension was cerium oxide abrasive powder mixed with water at a concentration of 1 percent by weight. The abrasive powder had an average diameter of 1.5 $\mu$m. The abrasive tape was pressed in contact with part of a side of a revolving disk contacting 20 percent of the area of the side and with a pressure of 62.5 g/cm$^2$. The disk revolved at a rate of 200 rpm. The glass disk had a center line average height Ra of 0.5 nm after the treatment, in contrast to its center line average height Ra of 15 nm before the treatment.

EXAMPLE 3

The side of a 2.5-inch glass disk was lapped. The first step of polishing was applied to the side, instead of the usual two-step polishing, followed by chemical strengthening. Then, the side was treated with a machine shown in FIG. 1. An abrasive tape, which consisted of a urethane-foam pad, was used. The abrasive suspension was cerium oxide abrasive powder mixed with water at a concentration of 1 percent by weight. The abrasive powder had an average diameter of 1.5 $\mu$m. The abrasive tape was pressed in contact with part of a side of a revolving disk contacting 20 percent by area of the side and with a pressure of 40 g/cm$^2$. The disk revolved at a rate of 200 rpm.

The surface roughness of a glass disk side was examined and evaluated before and after the treatment with an atomic force microscope (AFM). The glass disk had center line average height Ra of 0.2 nm after the treatment, compared to its center line average height Ra of 0.8 nm before the treatment.

Figure 2A:
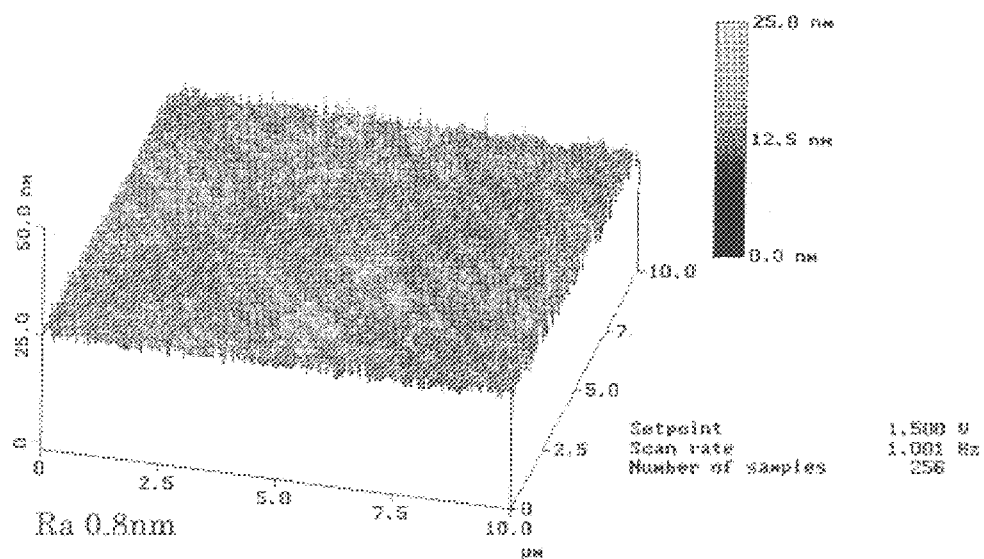
FIG. 2(a) and FIG. 2(b) are atomic force micrographs of a glass disk in example 3 taken before and after surface treatment respectively.
Figure 2B:
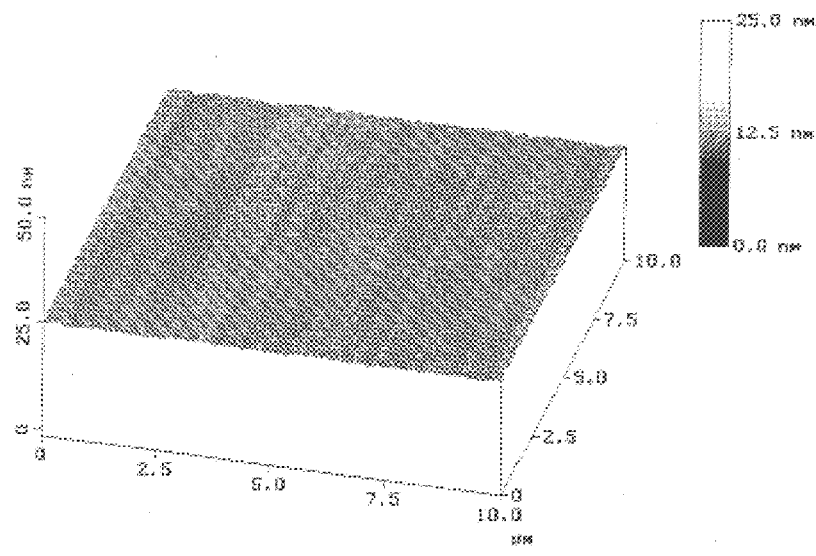

FIG. 2(a) shows an atomic force micrograph of a glass disk taken before treatment. FIG. 2(b) shows an atomic force micrograph of a glass disk taken after surface treatment. The change in the alkaline content of the side of a glass disk was undetectable, and no loss in disk strength was observed.

EXAMPLE 4

The side of a 2.5-inch glass disk was lapped, polished in two steps, and chemically strengthened conventionally. The glass disk was textured in the circumferential direction with the machine shown in FIG. 1 to prevent stiction between a magnetic head and the recording medium. An abrasive tape, which consisted of a urethane-foam pad, was used. The abrasive suspension was cerium oxide abrasive powder mixed with water at a concentration of 1 percent by weight. The abrasive powder had an average diameter of 1.5 $\mu$m. The abrasive tape was pressed in contact with part of a side of a revolving disk at a contact rate of 4 percent by area of the side and at a pressure of 440 g/cm$^2$. The disk revolved at a rate of 100 rpm.

The glass disk had center line average height Ra of 0.5 nm before and after the treatment. The surface of the glass disk, however, was textured in the circumferential direction with maximum height Rmax of approximately 7 nm. Change in an alkaline content of a side of a glass disk was undetectable, and no loss in disk strength was observed.

A non-magnetic substrate for a magnetic recording medium of the present invention is manufactured with the process comprising the step of pressing a running matrix of a surface-treating machine in contact with part of a side of a revolving presubstrate with abrasive suspension poured over. The magnetic recording medium comprises a non-magnetic under layer, a magnetic layer, a protective layer, and a liquid lubricating layer formed sequentially in that order on the non-magnetic substrate. The contact rate of a matrix pressed in contact with a presubstrate side, and the pressure per unit area applied through the matrix to a presubstrate side is regulated appropriately. This enables simultaneous polishing and texturing a non-magnetic metal presubstrate, thereby facilitating manufacture of a non-magnetic metal substrate, including an aluminum-alloy substrate, and improving the surface characteristics of the substrate remarkably. The surface treatment also improves surface characteristics of a non-magnetic nonmetal substrate remarkably. Of special importance is the application of the surface treatment to the manufacture of a chemically strengthened glass substrate. Treating a chemically strengthened side of a glass substrate in accordance with the present invention makes possible a delicate process of producing a mirror-finished surface while preventing alkaline elution. The surface treatment, further, enables the regulation of surface roughness to a desired value, thereby preventing stiction between a magnetic head and the magnetic medium. In addition, the present invention controls the growth of magnetic grains in a magnetic layer formed on the substrate.

A substrate with the improved surface characteristic imparted by the treatment, when used to make a magnetic recording medium, provides a magnetic recording medium with an excellent high recording density.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A manufacturing process for a non-magnetic substrate for a magnetic recording medium comprising:

pressing a running matrix of a surface-treating machine into contact with part of a side of a revolving presubstrate;

adding an abrasive suspension to said matrix; and the step of pressing including a contact rates of 15 to 25 percent by area of said side and at a pressure of 20 to 150 g/cm$^2$.

2. A substrate for a magnetic recording medium manufactured in accordance with the process as set forth in claim 1.

3. A magnetic recording medium with a substrate manufactured in accordance with the process as set forth in claim 1.

4. A manufacturing process of a non-magnetic substrate for a magnetic recording medium comprising the step of:

pressing a running matrix of a surface-treating machine into contact with part of a side of a revolving presubstrate;

adding an abrasive suspension to said matrix;

the step of pressing including contacting said substrate at contact rates of from about 2 to about 15 percent by area of said side; and the step of pressing further including pressing with a pressures of from about 25 to about to 800 g/cm$^2$.

5. A substrate for a magnetic recording medium manufactured in accordance with the process as set forth in claim 4.

6. A magnetic recording medium including a substrate manufactured in accordance with the process as set forth in claim 4.

7. A manufacturing process of a non-magnetic substrate for a magnetic recording medium as set forth in claim 1, wherein said non-magnetic substrate is a glass presubstrate and the step of pressing is followed by chemically strengthening said glass presubstrate.

8. A manufacturing process of a non-magnetic substrate for a magnetic recording medium as set forth in claim 4, wherein said non-magnetic substrate is a glass presubstrate and the step of pressing is followed by chemically strengthening said glass presubstrate.

9. A substrate for a magnetic recording medium manufactured in accordance with the process as set forth in claim 7.

10. A substrate for a magnetic recording medium manufactured in accordance with the process as set forth in claim 8.

11. A magnetic recording medium including a substrate as set forth in claim 9.

12. A magnetic recording medium including a substrate as set forth in claim 10.

13. A manufacturing process for a non-magnetic substrate for a magnetic recording medium as set forth in claim 1, wherein said presubstrate is a glass presubstrate and the step of pressing is preceded by chemically strengthening said non-magnetic presubstrate.

14. A manufacturing process for a non-magnetic substrate for a magnetic recording medium as set forth in claim 4, wherein said presubstrate is a glass presubstrate and the step of pressing is preceded by chemically strengthening said non-magnetic presubstrate.

15. A substrate for a magnetic recording medium manufactured in accordance with the process as set forth in claim 13.

16. A substrate for a magnetic recording medium manufactured in accordance with the process as set forth in claim 14.

17. A magnetic recording medium including a substrate as set forth in claim 15.

18. A magnetic recording medium including a substrate as set forth in claim 16.

19. A magnetic recording medium according to claim 3, wherein said magnetic recording medium includes:

a non-magnetic under layer on said substrate;

a magnetic layer on said non-magnetic under layer;

a protective layer on said magnetic layer; and a liquid lubricating layer on said protective layer, all of said layers being formed sequentially on said non-magnetic substrate one on top of another.

20. A magnetic recording medium according to claim 6, wherein said magnetic recording medium includes:

a non-magnetic under layer on said substrate;

a magnetic layer on said non-magnetic under layer;

a protective layer on said magnetic layer; and a liquid lubricating layer on said protective layer, all of said layers being formed sequentially on said non-magnetic substrate one on top of another.

* * * * *